US009229791B1

(12) United States Patent
Thekkeettil

(10) Patent No.: US 9,229,791 B1
(45) Date of Patent: Jan. 5, 2016

(54) SYSTEM AND METHOD FOR HIGH SPEED MULTIPLE BUFFER ALLOCATION

(75) Inventor: Madhusudhan Harigovindan Thekkeettil, Bangalore (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 679 days.

(21) Appl. No.: 13/594,343

(22) Filed: Aug. 24, 2012

(51) Int. Cl.
*G06F 9/54* (2006.01)

(52) U.S. Cl.
CPC ........................ *G06F 9/544* (2013.01)

(58) Field of Classification Search
CPC ..... G06F 3/00; G06F 2205/062; G06F 9/544; H04L 47/722
USPC ........................................................ 709/223
See application file for complete search history.

(56) References Cited

U.S. PATENT DOCUMENTS

| | | | | |
|---|---|---|---|---|
| 4,254,464 A * | 3/1981 | Byrne | | 710/100 |
| 5,490,280 A * | 2/1996 | Gupta et al. | | 712/23 |
| 5,627,984 A * | 5/1997 | Gupta | G06F 9/3836 | 712/200 |
| 5,640,604 A * | 6/1997 | Hirano | | 710/56 |
| 5,721,855 A * | 2/1998 | Hinton | G06F 9/30152 | 711/E12.049 |
| 5,758,149 A * | 5/1998 | Bierma | G06F 17/30348 | |
| 5,809,268 A * | 9/1998 | Chan | G06F 9/3836 | 712/200 |
| 5,907,717 A * | 5/1999 | Ellis | H04L 12/433 | 370/360 |
| 6,084,688 A * | 7/2000 | Stumbo et al. | | 358/1.17 |
| 6,185,221 B1 * | 2/2001 | Aybay | | 370/412 |
| 6,269,425 B1 * | 7/2001 | Mounes-Toussi | G06F 12/121 | 711/122 |
| 6,574,725 B1 * | 6/2003 | Kranich | G06F 9/30087 | 709/208 |
| 6,895,495 B1 * | 5/2005 | Holscher | | 712/200 |
| 6,938,097 B1 * | 8/2005 | Vincent et al. | | 709/240 |
| 7,010,655 B1 * | 3/2006 | Harmer et al. | | 711/163 |
| 7,366,797 B2 * | 4/2008 | Judd | G06F 12/084 | 709/250 |
| 7,379,067 B2 * | 5/2008 | Deering | G06T 15/005 | 345/506 |
| 7,587,549 B1 * | 9/2009 | Arulambalam et al. | | 711/112 |
| 8,024,522 B1 * | 9/2011 | Favor et al. | | 711/118 |
| 2002/0097674 A1 * | 7/2002 | Balabhadrapatruni et al. | | 370/229 |
| 2004/0001499 A1 * | 1/2004 | Patella et al. | | 370/412 |
| 2004/0215773 A1 * | 10/2004 | Strait | G06F 9/50 | 709/225 |
| 2006/0143334 A1 * | 6/2006 | Naik | | 710/56 |
| 2006/0179281 A1 * | 8/2006 | Jensen | G06F 9/3836 | 712/214 |
| 2008/0117462 A1 * | 5/2008 | Gaebel | | 358/1.17 |
| 2009/0083496 A1 * | 3/2009 | Stevens, Jr. | G06F 12/0808 | 711/144 |
| 2009/0251476 A1 * | 10/2009 | Jiao | G06F 9/383 | 345/543 |
| 2010/0100708 A1 * | 4/2010 | Ukai | G06F 9/3851 | 712/205 |
| 2011/0055346 A1 * | 3/2011 | Siddabathuni et al. | | 709/212 |
| 2013/0117497 A1 * | 5/2013 | Cui et al. | | 711/103 |

\* cited by examiner

*Primary Examiner* — O.C. Vostal
(74) *Attorney, Agent, or Firm* — Klein, O'Neill & Singh, LLP

(57) ABSTRACT

An adapter for high speed multiple buffer allocation is provided. The adapter is configured with logic to search a data buffer availability vector corresponding to data buffer storage elements from low priority to high priority and from high priority to low priority in parallel thereby enabling multiple data buffers to be located in a single path and reducing the impact of pipelining.

17 Claims, 7 Drawing Sheets

SYSTEM AND METHOD FOR HIGH SPEED MULTIPLE BUFFER ALLOCATION

TECHNICAL FIELD

The present disclosure relates generally to resource management in a computer system, and more particularly to a system and method for high speed buffer allocation in a computer system.

RELATED ART

Computer networks commonly are used to transfer information to and from computing systems. Network adapters or interface cards are commonly used to receive network information (as packets or frames) from other network devices and systems and forward the information to a computing system or another device. Network adapters are also used to transfer information from a computing system to other devices and systems.

Typically, network adapters use buffers (memory storage location within memory modules) to handle network traffic. Receive buffers are used to temporarily store network information received by a network adapter, and transmit buffers are used to temporarily store information that is sent by a computing system via the network adapter. Accessing transit or receive buffers may present a bottleneck and limit the speed at which data may be transferred through a network adapter.

Network adapters today can transfer data over a network link at very high rates, for example, 10 gigabits per second (10G) or more. Additionally, network adapters today often include various hardware components that may need to access commands or data from memory buffers. As network adapters transfer speeds increase, there is a need for efficient buffer management in network adapters.

SUMMARY

In some aspects, the disclosure provides a method for allocating multiple buffers for processing a command by a network device, the method comprising: receiving the command for processing data associated with the command; determining a number of buffers needed to process the received command; searching a storage device in the network device to locate at least a number of available buffers equivalent to the number of buffers needed, the available buffers being located by executing instructions to cause a first search of the storage device from a low priority to a high priority direction and to cause a second search the storage device from a high priority to a low priority direction, the first search and the second search being conducted in parallel; allocating the located buffers when the number of buffers needed is equivalent to the available buffers located. In some aspects of the disclosure, the first search and the second search are performed in substantially the same clock cycle.

In some aspects, the disclosure provides an adapter for allocating buffers for processing a command, comprising: a storage device including a plurality of buffers for storing data associated with the command; and a buffer manager to determining a number of buffers needed to process the received command, to locate at least a number of available buffers equivalent to the number of buffers needed and to allocate the located buffers, the available buffers being located by executing instructions to cause a first search of the storage device from a low priority to a high priority direction and to cause a second search the storage device from a high priority to a low priority direction, the first search and the second search being conducted in parallel.

In some aspects, the disclosure provides system for allocating buffers to process a command, the system comprising: an adapter for receiving a command for processing data; a storage device including a plurality of buffers for temporarily storing data associated with the command; a buffer manager for determining a number of buffers needed to process the received command, to locate at least a number of available buffers equivalent to the number of buffers needed and to allocate the located buffers; a first processor to execute instructions from the buffer manager to cause a first search of the storage device from a low priority to a high priority direction; and a second processor to execute instructions from the buffer manager to cause a second search of the storage device from a high priority to a low priority direction, the first search and the second search being conducted in parallel.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The foregoing features and other features of the disclosure will now be described with reference to the drawings of the various embodiments. In the drawings, the same components have the same reference numerals. The illustrated embodiments are intended to illustrate, but not to limit the disclosure. The drawings include the following figures.

DETAILED DESCRIPTION

To facilitate an understanding of the various embodiments, the general architecture and operation of a computing system is first described. The specific architecture and operation for the various embodiments will then be described with reference to the general architecture.

As a preliminary note, as used in this disclosure, the terms "component", "module", "system" and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including but not limited to, an ASIC (application specific integrated circuit), CD (compact disc), DVD (digital video disk), ROM (read only memory), floppy disk, hard disk, EEPROM (electrically erasable programmable read only memory), memory stick flash drive, or any other storage device type, in accordance with the claimed subject matter.

Figure 1A:
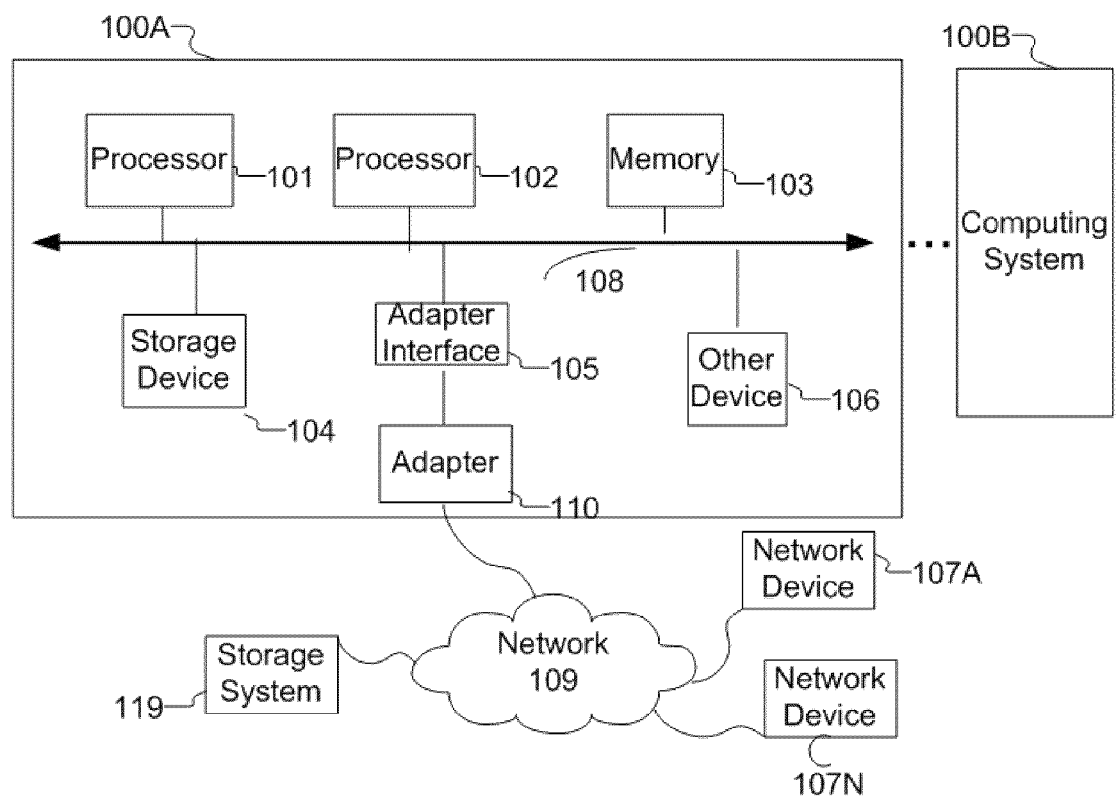
FIG. 1A is a block diagram illustrating the internal functional architecture of a computing system according to one embodiment.

FIG. 1A shows a block diagram of the internal functional architecture of an exemplary computing system 100 that may be used to implement various aspects disclosed herein. The computing system 100 may include a first and second processor (may be referred to as central processing units (CPUs)) 101 and 102 which interface with a bus 108. Processors 101 and 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Bus 108 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of interconnect.

Each of the CPUs 101 and 102 may comprise a general-purpose process or another type of processor. Processors 101 and 102 interface with bus 108 and execute programmable instructions out of memory 103. Bus 108 may be, for example, a system bus, a Peripheral Component Interconnect (PCI) bus (or PCI Express bus), a HyperTransport or industry standard architecture (ISA) bus, a Small Computer System Interface (SCSI) bus, a universal serial bus (USB), an Institute of Electrical and Electronics Engineering (IEEE) standard 1394 bus (sometimes referred to as "Firewire"), or the like.

The computing system 100 may also include a storage device 104, which may include, for example, a hard disk, a CD-ROM, a non-volatile memory device (e.g., flash or memory stick) or any other type of storage device. Storage device 104 may store processor executable instructions and data, for example, operating system program files, application program files, and other files. For example, the first CPU 101 and the second CPU 102 may, independently or in combination, execute computer-executable process steps of an application program so that CPU 101 and CPU 102 may properly execute the application program.

In some embodiments, the processor executable instructions and data may be stored using an installation program. For example, a processor (101, 102) may execute computer-executable instructions of an installation program so that the processor (101, 102) may properly execute the application.

The computing system 100 may also include a memory (e.g., RAM) 103 that interfaces with the bus 108 to provide the CPUs 101, 102 with access to memory storage. When executing stored computer-executable process steps from the storage device 104, the CPUs 101, 102 may store and execute the process steps out of the memory 103.

The computing system 100 also includes other devices 106, which may include, for example, input-output devices (e.g., keyboard, mouse and others), video graphics and/or sound generation hardware.

The computing system 100 may further include a network adapter 110 (may be referred to as a network device) that is coupled to bus 108 via an adapter interface 105 and then to other components of the computing system 100. The network adapter 110 may be connected to other systems, for example, network devices 107A-107N through a network 109. The network adapter 110 may be adapted to one or more of a wide variety of networks, including local area networks, storage area networks, wide area networks, server networks, the Internet, and the like. The adapter 110 may be configured to handle both network and storage traffic communications with network devices 107A-107N and storage system 119 via network 109.

Adapter 110 may use various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 110 shown in FIG. 1A may be configured to operate as a FCOE adapter and may be referred to as FCOE adapter 110. QLogic Corporation, the assignee of the present application, provides one such adapter. Those of ordinary skill in the art will appreciate, however, that the present embodiments are not limited to any particular protocol. The illustrated adapter 110 is merely one example of a converged network adapter that may leverage the advantages of the present embodiments.

Figure 1B:
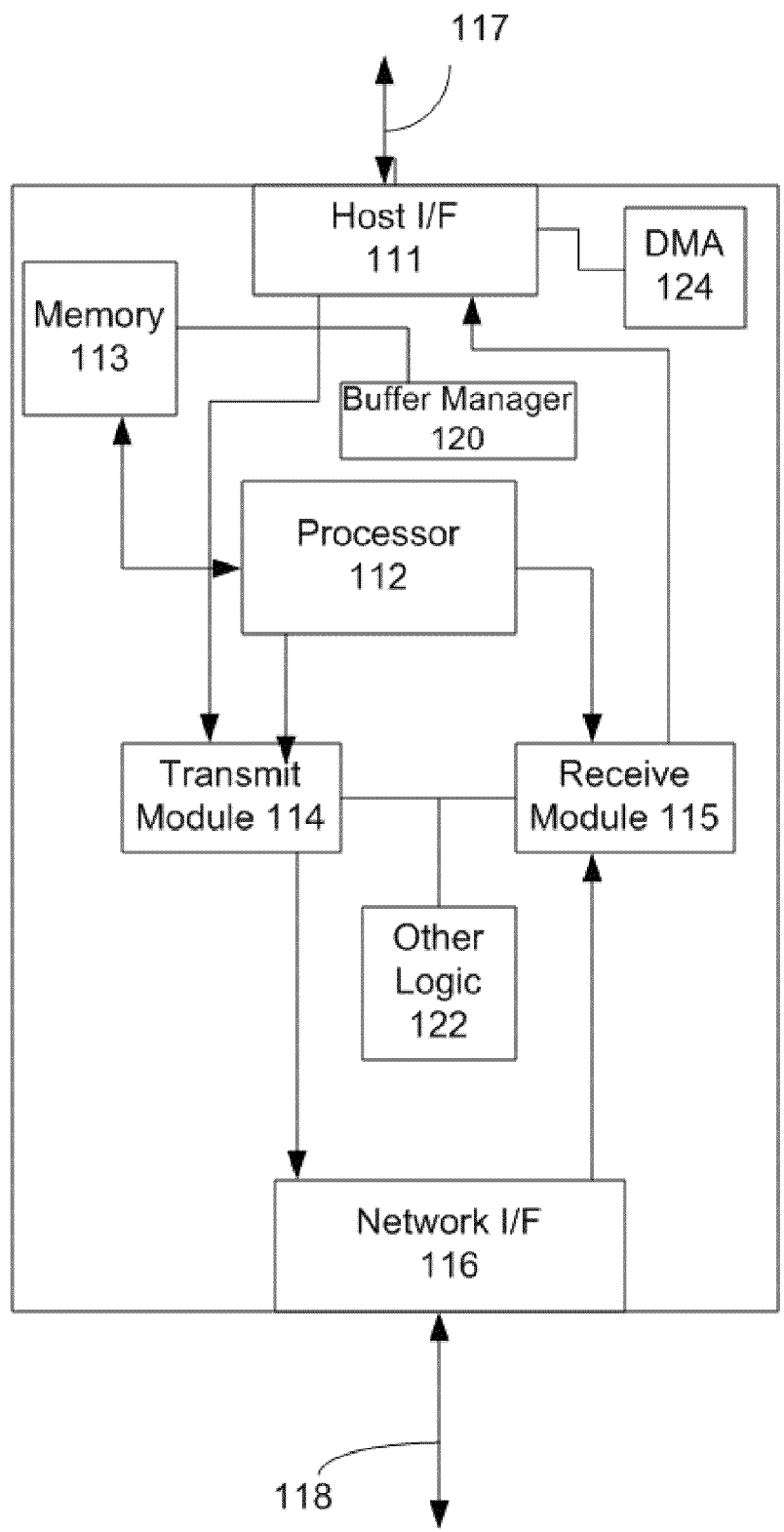
FIG. 1B is a block diagram illustrating an adapter according to one embodiment.

FIG. 1B shows a block diagram of adapter 110 (may also be referred to as network adapter 110), used according to one embodiment. Adapter 110 includes a processor 112 that may execute firmware instructions out of memory 113 for controlling overall functionality of adapter 110. Although one processor 112 is shown, this is exemplary only, and the adapter 110 may be configured with additional processors to improve processing efficiency. Processor 112 may be a reduced instruction set computer (RISC) processor or any other hardware based processor device. A host interface 111 interfaces with computing system 100 via interconnect 117. The structure and design of interface 111 depends on the type of interconnect. For example, if interconnect 117 is a PCI-Express link, then host interface 111 includes logic and circuitry to handle PCI-Express based traffic. The embodiments herein are not limited to any particular interconnect type.

Adapter 110 includes a transmit module 114 for handling transmit traffic from adapter 110. The transmit traffic is sent by computing system 100. Transmit module 114 may include memory buffers (not shown) for storing transmit packets.

Adapter 110 also includes a receive module 115 that processes network information received from network 108 via link 118. Receive module 115 may also include memory buffers for temporarily storing network information that is received from network 108, before the information is sent to computing system 100.

Adapter 110 further includes a network interface 116. The design and structure of interface 116 depends on the network protocol and network link 118. For example, to handle FCOE traffic, interface 116 will have logic and circuitry to send and receive FCOE packets. Similarly, where adapter 110 is an Ethernet, Fibre Channel or any other type of adapter, then it will have the necessary structure and design to handle the relevant protocol/standard.

Adapter 110 may additionally include a buffer manager 120. Buffer manager 120 is used to control the flow of traffic within the adapter between the memory 113 and the transmit module 114 and the receive module 115. Buffer manager 120 may also be used to allocate buffer space in memory buffers included in the receive module 115 and the transit module 114. In one embodiment, the buffer manager 120 may further include priority encoders which are used to locate an available buffer by accessing a buffer availability vector, as described below in detail.

Adapter 110 may also include a direct memory access (DMA) 122 and other logic 124 which may be used to process other protocols for handling data transfers and other data transactions within the computer network.

Figure 2:
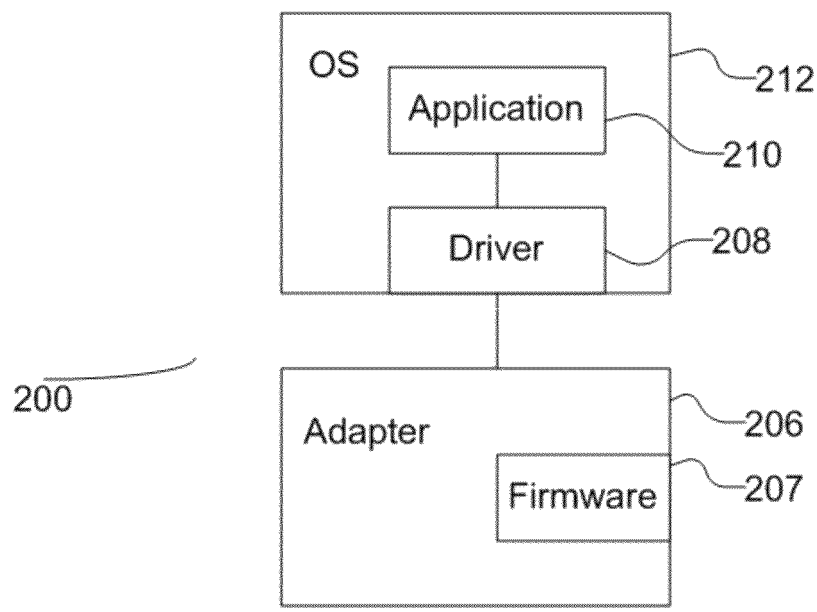
FIG. 2 is a block diagram of an architecture used by a computing system for data transfer over a network according to one embodiment.

FIG. 2 is a block diagram of an architecture 200 used by a computing system for data transfer over a network. Architecture 200 includes an operating system 212 and a network adapter 206 (similar to adapter 110) that couples to a network for data transfer. Device driver 208 and an application program 210 may also be executed within the operating system 212.

The network adapter 206 executes firmware 207 that communicates with the device driver 208. The device driver 208 in turn communicates with the application program 210. In one embodiment, the application program 210 may communicate with the kernel part of the operating system 212. Additionally, the device driver 208 may be part of the operating system kernel.

Operating system 212 may be a Windows based, Linux based, Solaris, Unix or any other operating system type. Operating system 212 provides an interface between application programs 210 and adapter 206 (similar to adapter 110). For example, operating system 212 may be used to schedule tasks, allocate storage, and handle the interface to peripheral hardware, such as hard drives, optical disk drives, tape drives, network adapters, and the like. The operating system may be split into a kernel and various system programs. The system programs use facilities provided by the kernel to perform higher-level tasks Operating system 212 interfaces with application programs, for example, 210 for performing certain operations. For example, application program 210 may transmit a request to access peripheral hardware, for example, adapter 206. This request is received by the operating system 212, which in turn translates the request to a format useable by the device.

To facilitate network communication, the operating system 212 may execute a set of programs known as a network protocol stack. The nature and structure of the protocol stack would depend on the protocol that is being used for network communication.

Device driver 208 includes processor executable instructions used to control a peripheral device, for example, adapter 206. The device driver is usually a routine or set of routines that implements device-specific aspects of generic input/output operations. The device driver may be responsible for accessing hardware registers of adapter 206 starting and completing input/output operations, performing error processing, and often includes an interrupt handler to service interrupts generated by the adapter 206.

To transfer data between a CPU to the network adapter 206, one or more buffers (each with a plurality of memory locations) are used to temporarily store data packets. Such buffers are also commonly termed queues. In a receive path (i.e., data packets received from the network adapter), receive buffers are used. In a transmit path (i.e., data packets sent to the network adapter) transmit buffers are used. A completion buffer may be also used to post status when an I/O operation is complete. Usually, the device driver 208 abstracts hardware specificity and interfaces with the operating system 212. The device driver 208 may also allocate buffers.

Figure 1C:
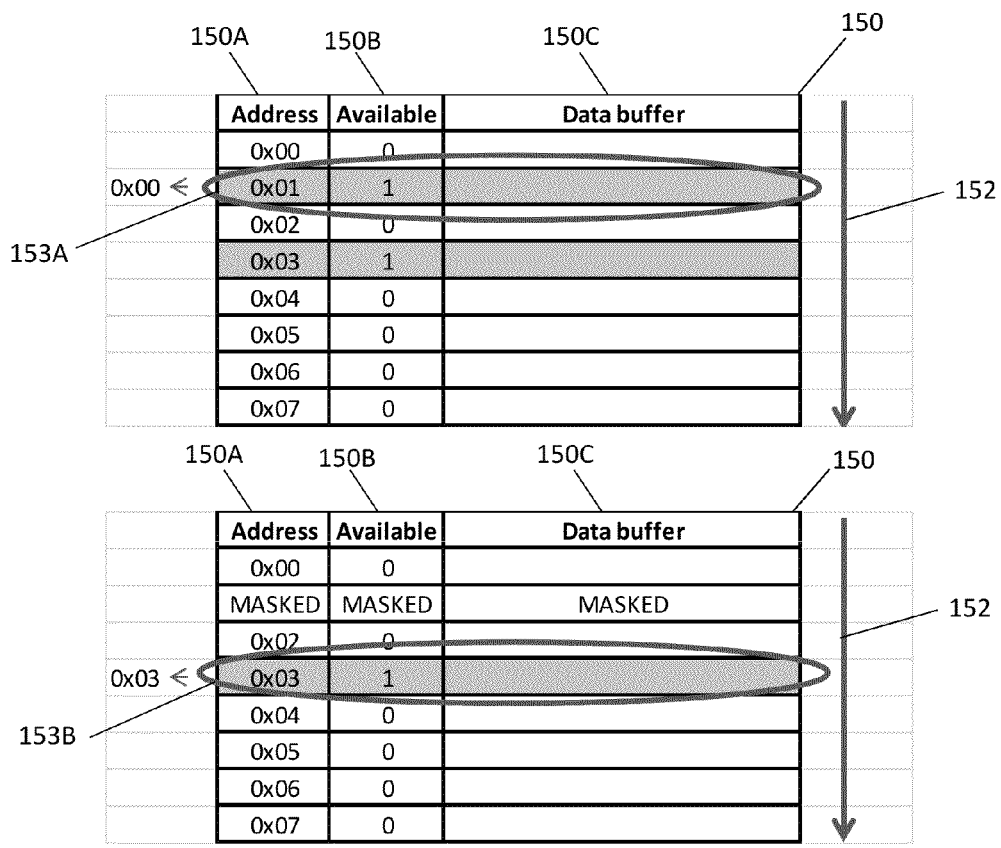
FIG. 1C illustrates a conventional buffer allocation approach in an exemplary scenario in which two or more data buffers are to be allocated to a single transaction.

FIG. 1C illustrates a conventional buffer allocation approach in an exemplary scenario in which two or more data buffers are to be allocated to a single transaction. In conventional buffer allocation approaches, it is very common to implement data transfer protocols through a read or write channel. In a computing block that serves as an intermediate buffering unit to store or to read or write data, only a limited amount of command and data storage can be implemented. As such, it may be necessary to allocate a command entry (e.g., read, write, and read modify write that depicts the higher level transaction) and assign to it a single data buffer or multiple data buffers, upfront. Since the lifetime of a command may vary based on the application and because the number of data buffers required per command may vary, a simple FIFO mechanism may be insufficient.

FIG. 1C shows a layout 150 for data buffers that are allocated for processing a command. The command may be stored at a command buffer (not shown) to move data received via network 109 (FIG. 1A) or transmit data from adapter 110 to any other device via network 109. Layout 150 stores an address 150A for each data buffer allocation shown in column 150C. Column 150B shows a data buffer location available to store data.

Typically a command is received for processing data at adapter 110. To process the command one or more buffers may have to be allocated. As an example, two data buffers may be needed to process a command. In the example of FIG. 1C, the data buffers of layout 150 are searched in a first find approach in which the buffers are searched from high priority to low priority, as is illustrated by way of the downward arrow 152. On a first pass, an available buffer at address 0x01 (153A) is located. This buffer address is then masked and the buffers are again searched from high priority to low priority.

On the second pass, an available buffer is located at address 0x03 (153B). Having located the two buffers needed, these buffers may be allocated. Accordingly, in this example, the conventional allocation approach requires at least two passes when multiple buffers are needed. The conventional approach is undesirable as multiple components within the adapter 110 may request multiple buffers. Command processing becomes slow because adapter 110 has to perform multiple searches. The embodiment disclosed herein provides an efficient solution.

Figure 1D:
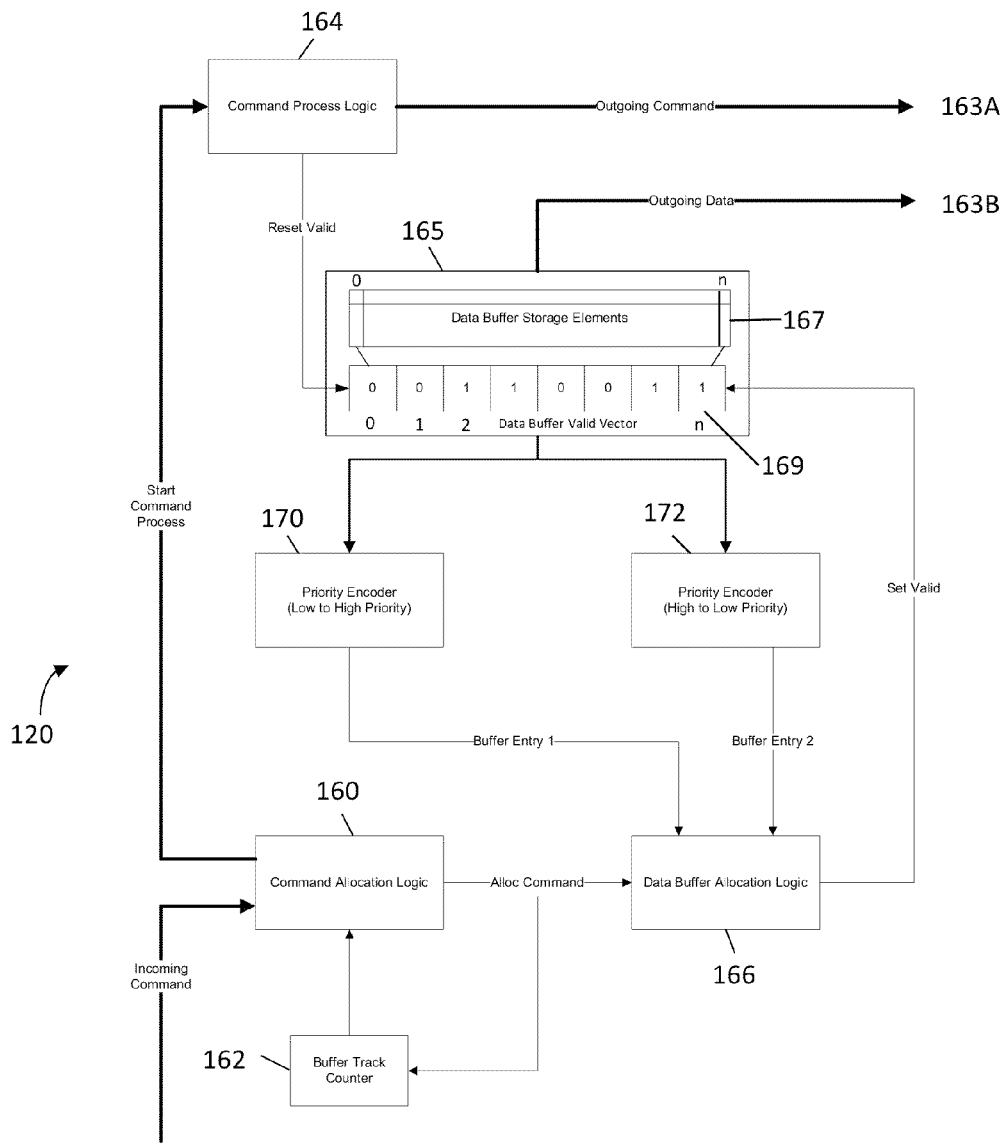
FIG. 1D is a block diagram illustrating logic for implementing multiple buffer allocation according to one embodiment.

FIG. 1D is a block diagram illustrating logic for implementing multiple buffer allocation in accordance with aspects of the present disclosure. In some embodiments the logic may be implemented via circuitry included in adapter 110, such as the buffer manager 120, for example.

Referring to FIG. 1D, an incoming command is received at a command allocation logic block 160. The command allocation logic block 160 decodes the incoming command and determines a number of buffers needed to process the received command. The command allocation logic block may also set a buffer track counter 162 according to the determined number of buffers needed. The command allocation logic block sends a signal to the command process logic block 164 to start the command processing. The command process logic block 164 initiates a search of storage unit 165 having a plurality of storage locations (may be referred to as buffer locations or data buffer storage elements).

The storage unit 165 may include a plurality of data buffer storage elements 167 and a data buffer availability vector 169. The data buffer availability vector 169 includes a plurality of elements, each of which corresponds to a data buffer storage element of a plurality of data buffer storage elements 167. Each element of the data buffer availability vector 169 provides an indication of whether a corresponding data buffer storage element in storage unit 165 is available. For example, location 0 of the data buffer availability vector 169 has a value of '0' which indicates that a corresponding data buffer storage element location 0 is not available. On the other hand, a data storage location n has a value of '1' which indicates that a corresponding data buffer storage element location n is available.

The buffer manager 120 includes priority encoders 170 and 172. While the present embodiment includes two priority encoders, such is exemplary only and not limiting. In some embodiments, the priority encoders 170 and 172 may be implemented by instructions executed by processor 112. In some embodiments, additional processors (not shown) may be included in the adapter to execute instructions to implement a priority encoder, thereby improving the performance of priority encoders 170 and 172, which may operate in parallel at substantially the same time.

Priority encoder 170 may be configured to search the data buffer availability vector 169 from low priority to high priority. On the other hand, priority encoder 172 may be configured to search the data buffer availability vector 169 from high priority to low priority.

In some embodiments, priority encoders 170 and 172 may be configured to search the data buffer availability vector 169 in parallel. In some embodiments, priority encoders 170 and 172 may be configured to search the data buffer availability vector 169 substantially simultaneously. Accordingly, when the number of buffers needed to process the received command is two or more, priority encoders 170 and 172 may be configured to identify two available data buffer storage elements in a single pass of the data buffer availability buffer. For example, in the illustrated embodiment, priority encoder 170 may identify data buffer location 2 as available and priority encoder 172 may identify location n as available in a first pass of the data buffer availability vector 169.

Having located the available data buffer locations, priority encoders 170 and 172 compute the data buffer entries that will be allocated with the received command. The identified data buffer availability vector locations may then be reset, to indicate that the corresponding data buffer storage elements are not available. The priority encoder 170 and 172 output the data buffer entries which are provided to data buffer allocation logic block 166. The data buffer storage elements corresponding to the output data buffer entries are allocated. The buffer track counter 162 is in turn decremented. Additional buffers may be located until all of the buffers needed to process the command have been allocated.

After the command has been processed, an outgoing command 163A and data 163B are output via the command process logic block 164 and storage unit 165, respectively. When the allocated buffers are relinquished, the data buffer availability vector locations corresponding to the relinquished data buffer storage elements may be reset to 1 to indicate that these buffers are available.

Figure 1E:
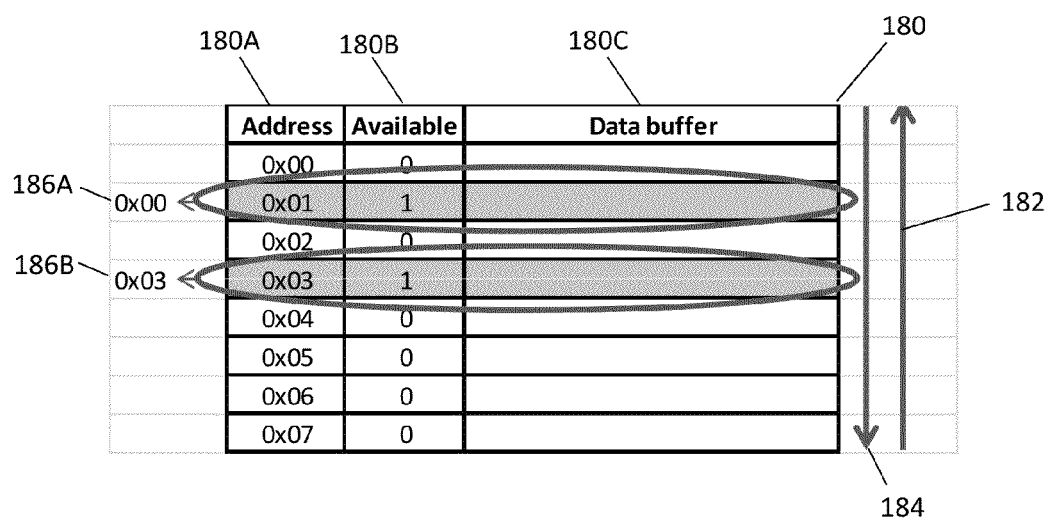
FIG. 1E is a buffer layout illustrating efficient buffer allocation according to one embodiment.

FIG. 1E shows an exemplary layout 150 in which two data buffers are allocated for processing a command in accordance with one embodiment. The command may be stored at a command buffer (not shown) to move data received via network 109 (FIG. 1A) or transmit data from adapter 110 to any other device via network 109. Layout 180 stores an address 180A for each data buffer allocation shown in column 180C. Column 180B shows a data buffer location available to store data.

As shown in FIG. 1E, the data buffers of layout 180 are searched in a first find approach in which the buffers are searched from high priority to low priority, as is illustrated by way of the downward arrow 184. The data buffers of layout 180 are also searched in a last find approach in which the buffers are searched from low priority to high priority, as is illustrated by way of the upward arrow 182. Accordingly, on a first pass, an available buffer at address 0x00 (186A) is located and an available buffer is located at address 0x03 (186B). Having located the two buffers needed, these buffers may be allocated. Advantageously, multiple buffers may be located in a single pass thereby improving processing efficiency.

Figure 3:
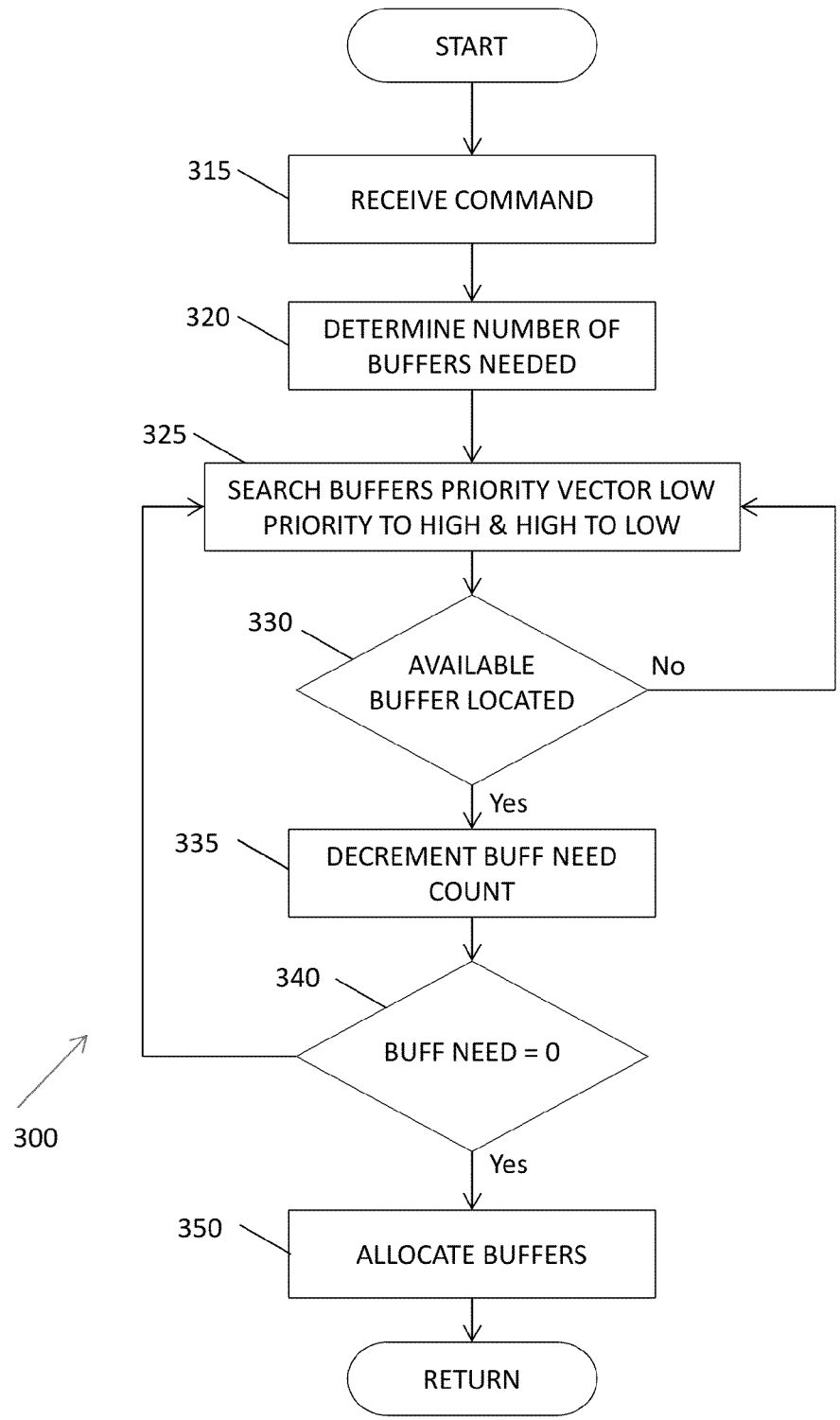
FIG. 3 is a flow diagram illustrating a process for multiple buffer allocation according to one embodiment.

FIG. 3 is a flow diagram illustrating a process 300 for multiple buffer allocation in accordance with aspects of the present disclosure. At block 315, the process receives a command. The command may be, for example, a read command, a write command, a read modify write command, or any other command. The command may be to transmit data out of adapter 110 or to process data received.

At block 320, the process determines a number of buffers needed to process the command. In some embodiments, the process decodes the incoming command to determine the number of buffers needed.

At block 325, the process then searches buffers from low priority to high priority and from high priority to low priority to locate available buffers. In some embodiments, the process uses priority encoders to search a buffer availability vector to locate the available buffers. A first priority encoder may be used to search the buffer availability vector from a high priority to low priority direction. A second priority encoder may be used to search the buffer availability vector from a low priority to high priority direction. In some embodiments, the first priority encoder and the second priority are independent and configured to perform the buffer searches in parallel, preferably within a same clock cycle.

At block 330, the process determines whether available buffers have been located. If no available buffers have been located, the process returns to block 325 to repeat the search for available buffers. On the other hand, if available buffers have been located, at block 335, the process decrements a buffer needed counter according to the number of buffers located.

At block 340, the process determines whether the buffer needed count is 0. If the buffer needed count is not equal to 0, the process returns to block 325 and repeats the search for available buffers. On the other hand, when the buffer needed counter is 0, at block 350, the process allocates the located buffers.

Thereafter, the process returns.

Accordingly, when compared to the conventional approaches, the techniques of the present embodiment advantageously reduce pipelining effects, particularly where multiple buffers must be allocated to process a command.

The disclosure therefore provides an adapter, system and method for allocating multiple buffers in a data storage network. Although the disclosure has been described with respect to certain embodiments, it should be recognized that the disclosure may be practiced other than as specifically described, the disclosure comprising the claims and their insubstantial variations supported by this disclosure.

What is claimed is:

1. A method for allocating multiple buffers for processing a command by a network device, the method comprising:
   receiving the command for processing data associated with the command;
   determining a number of buffers needed to process the received command, based on decoding the received command;
   searching a storage device in the network device to locate at least a number of available buffers equivalent to the number of buffers needed, the available buffers being located by executing instructions to cause a first search of the storage device from a low priority to a high priority direction and to cause a second search of the storage device from a high priority to a low priority direction, the first search and the second search being conducted in parallel;
   repeating the first search and the second search when the number of buffers located is less than the number of buffers needed; and
   allocating the located buffers when the number of buffers needed is equivalent to the available buffers located.

2. The method of claim 1, wherein the number of buffers needed is at least two.

3. The method of claim 1, wherein the first search includes searching a buffer availability vector from a low priority to a high priority direction and the second search includes searching the buffer availability vector from a high priority to a low priority direction.

4. The method of claim 1, wherein the first search and the second search are performed in substantially the same clock cycle.

5. The method of claim 1, wherein the network device is an adapter coupled to a computing system and at least one other device.

6. The method of claim 1, wherein the received command is to process data received by the network device from a network.

7. The method of claim 1, wherein the received command is to transmit data via a network.

8. The method of claim 1, wherein the received command is sent by one of a plurality of components of the network device.

9. An adapter for allocating buffers for processing a command, comprising:
   a storage device including a plurality of buffers for storing data associated with the command; and
   a buffer manager to determine a number of buffers needed to process the received command based on decoding the received command, to locate at least a number of available buffers equivalent to the number of buffers needed and to allocate the located buffers, the available buffers being located by executing instructions to cause a first search of the storage device from a low priority to a high priority direction and to cause a second search of the storage device from a high priority to a low priority direction, the first search and the second search being conducted in parallel; wherein the buffer manager repeats the first search and the second search when the number of located buffers is less than the number of buffers needed to update the located buffers.

10. The adapter of claim 9, wherein the number of buffers needed is at least two.

11. The adapter of claim 9, wherein the first search includes searching a buffer availability vector from a low priority to a high priority direction and the second search includes searching the buffer availability vector from a high priority to a low priority direction.

12. The adapter of claim 9, wherein the first search and the second search are performed in substantially the same clock cycle.

13. The adapter of claim 9, wherein the received command is to process data received by from a network.

14. The adapter of claim 9, wherein the received command is to transmit data via a network.

15. A system for allocating buffers to process a command, the system comprising:
   an adapter for receiving a command for processing data;
   a storage device including a plurality of buffers for temporarily storing data associated with the command; and
   a buffer manager for determining a number of buffers needed to process the received command, to locate at least a number of available buffers equivalent to the number of buffers needed and to allocate the located buffers;
   a first processor to execute instructions from the buffer manager to cause a first search of the storage device from a low priority to a high priority direction; and
   a second processor to execute instructions from the buffer manager to cause a second search of the storage device from a high priority to a low priority direction, the first search and the second search being conducted in parallel;
   wherein the first search and the second search are repeated when the number of buffers located is less than the number of buffers needed.

16. The system of claim 15, wherein the received command is to process data received by the network device from a network.

17. The system of claim 15, wherein the received command is to transmit data via a network.

* * * * *